United States Patent [19]
Fraidlin et al.

[11] Patent Number: 5,844,787
[45] Date of Patent: Dec. 1, 1998

[54] ISOLATED FLYBACK SECONDARY INDUCTOR CONVERTOR

[75] Inventors: Simon Fraidlin, Plano, Tex.; Anatoly G. Polikarpov; Nickolay A. Snetkov, both of Moscow, Russian Federation

[73] Assignee: Lucent Technologies, Inc., Murray Hill, N.J.

[21] Appl. No.: 940,087

[22] Filed: Sep. 29, 1997

[51] Int. Cl.⁶ .................................................. H02M 3/335
[52] U.S. Cl. ................................................ 363/21; 363/16
[58] Field of Search ................................. 363/16, 21, 126

[56] References Cited

U.S. PATENT DOCUMENTS

| | | | |
|---|---|---|---|
| 4,355,352 | 10/1982 | Bloom et al. | 363/16 |
| 4,864,478 | 9/1989 | Bloom | 363/16 |
| 5,008,794 | 4/1991 | Leman | 363/21 |
| 5,115,185 | 5/1992 | Fraidlin et al. | 323/207 |
| 5,706,182 | 6/1998 | Faulk | 363/16 |
| 5,748,457 | 5/1998 | Poon et al. | 363/16 |

OTHER PUBLICATIONS

Disclosure entitled "A Single–Switch Single Stage Active Power Factor Corrector with High Quality Input and Output" by Kurt Schenk and Slobodan Cuk of California Institute of Technology: 7 pages.

Publication from the Unitrode Switching Regulated Power Supply Design Seminar Manual entitled "High Power Factor Preregulator Using the SEPTIC Converter" by Lloyd Dixon: May 1993.

*Primary Examiner*—Peter S. Wong
*Assistant Examiner*—Rajnikant B. Patel

[57] ABSTRACT

An isolated flyback secondary inductor converter (IFSIC) and method of operation thereof. The IFSIC has a transformer with a primary winding for receiving electrical energy from a source of electrical power and a secondary winding coupled to the primary winding. The IFSIC also has a switch for intermittently coupling the transformer to the source of electrical power. The IFSIC includes a series-coupled inductor and diode coupled in parallel with the secondary winding to provide a path for the energy from the transformer when the transistor is ON, allowing the energy to be stored in the inductor rather than in the transformer.

20 Claims, 4 Drawing Sheets

ISOLATED FLYBACK SECONDARY INDUCTOR CONVERTOR

TECHNICAL FIELD OF THE INVENTION

The present invention is directed, in general, to power supplies and, more specifically, to an isolated flyback secondary inductor converter (IFSIC) topology.

BACKGROUND OF THE INVENTION

In the consumer electronics market, power supplies are mass-produced commodities. This is particularly true with respect to low power applications, where low cost is a principal concern. In view of cost limitations, many power supplies are based on well known topologies such as a flyback converter. For a general explanation of converter topologies, including the topologies hereinafter described, see *Modern DC-to-DC Switchmode Power Converter Circuits,* by Gordon Bloom, et al., Van Nostrand Reinhold Company (1984), which is incorporated herein by reference.

The flyback converter generally includes a switching device coupled to a source of electrical power and a primary winding of a transformer. The secondary winding of the transformer is coupled to a filter circuit and a load powered by the flyback converter. The transformer generally provides electrical isolation and stores and transfers energy from the primary to secondary winding thereof. While the flyback converter is generally well known and conventional, it suffers from numerous drawbacks. First, the magnetic construction of the transformer leads to an inefficient energy transfer between the primary and secondary winding of the transformer. For instance, the transformer is typically large and inefficient due to the large flux excursions experienced therein. These flux excursions are often asymmetrical and thus require transformer gapping, further reducing the efficiency of the converter. The flyback converter also exhibits poor scalability whereby extensive circuit modifications are necessary to achieve even slight design adjustments in power or output configuration.

One technique to improve the efficiency of the flyback converter is to separate the isolation function and the energy transfer function within the converter. A single ended primary inductor converter (SEPIC) separates the above-referenced functions by introducing an inductor in the primary side of the converter. Thus, the transformer predominantly performs the isolation function and the inductor performs periodic energy storage and, subsequently, transfer from the primary winding to the secondary winding of the converter. While the SEPIC achieves improved efficiencies over the conventional flyback converter, the SEPIC still suffers from a few limitations. First, the leakage inductance of the transformer impedes the transfer of energy from the inductor of the primary side of the transformer to the load coupled to the secondary side of the transformer. As a result, the overall efficiency of the energy transfer is hindered. Additionally, the resulting operation of the SEPIC does not facilitate an optimal reset of the core of the transformer further diminishing the overall efficiency of the converter.

Accordingly, what is a need in the art is an improved system and method that mitigates the above-mentioned drawbacks while reducing the cost and count of parts. In particular, what is a needed is an improved flyback converter topology that employs more efficient magnetics. There is still further a need for a flyback converter topology that exhibits good scalability, whereby simple modifications may be made for different power levels and output configurations.

SUMMARY OF THE INVENTION

To address the above-discussed deficiencies of the prior art, the present invention provides an isolated flyback secondary inductor converter (IFSIC) and method of operation thereof. The IFSIC has a transformer with a primary winding for receiving electrical energy from a source of electrical power and a secondary winding coupled to the primary winding. The IFSIC also has a switch for intermittently coupling the transformer to the source of electrical power. The IFSIC includes a series-coupled inductor and diode coupled in parallel with the secondary winding to provide a path for the energy from the transformer when the transistor is ON, allowing the energy to be stored in the inductor rather than in the transformer.

The present invention therefore introduces the broad concept of relieving the transformer in a flyback converter topology of having to store energy while the transistor is ON. Instead, the inductor (located on the secondary side of the transformer) stores and transfers the energy, allowing the transformer to assume primarily an isolation role.

In one embodiment of the present invention, the switch is a metal oxide semiconductor field-effect transistor ("MOSFET"). Of course, other solid state switches are within the broad scope of the present invention.

In one embodiment of the present invention, the IFSIC further includes a second primary winding and a second diode. The switch intermittently couples one of the primary windings to the source of electrical power and the second diode intermittently couples another of the primary windings to the source of electrical power. Those skilled in the art should be familiar with how active and passive switches can be employed to transfer power from the input of a power supply to the transformer therein.

In one embodiment of the present invention, the IFSIC further includes a second primary winding, a capacitor and a second diode that cooperate to substantially protect the switch from overvoltage transients.

In one embodiment of the present invention, the IFSIC further includes a capacitor for storing the energy and delivering the energy to an output of the IFSIC.

In one embodiment of the present invention, the IFSIC further includes a controller that modulates a switching of the switch. Those skilled in the art should be familiar with controllers (such as switched-mode controllers).

In one embodiment of the present invention, the transformer is free of a gap in a core thereof. One advantage of the present invention is that, if the transformer has a core, the core can be gapless, rendering the transformer as a whole more efficient.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
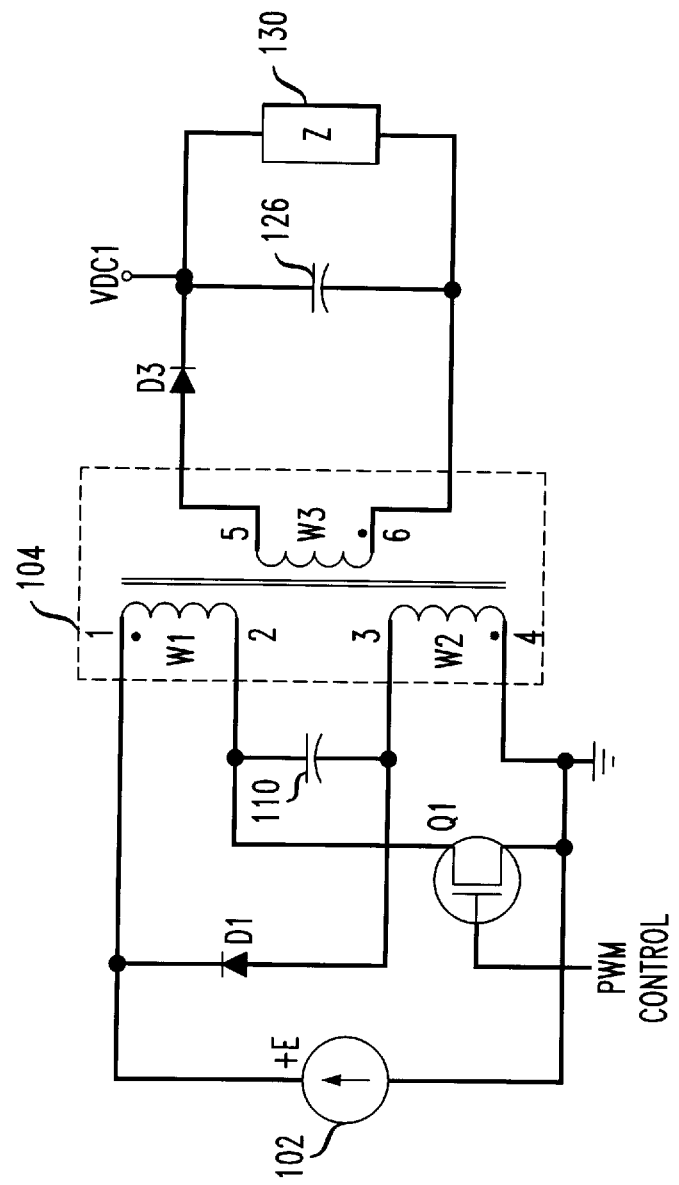
FIG. 1 illustrates a schematic diagram of a prior art flyback converter.

Referring initially to FIG. 1, illustrated is a schematic diagram of a prior art flyback converter 100. The flyback converter 100 powers a load 130. For example, in a personal computer, the load may include a motherboard, one or more disk drives, "plug-in" dynamic random access memory ("DRAM") chips, a monitor, modem(s) or video card(s). The flyback converter 100 generates an output voltage VDC1 (e.g., +5 volts). The output voltage VDC1 is supplied by a conductor to the load 130.

The flyback converter 100 is coupled to a source of electrical power 102 and an input voltage +E is applied to a transformer 104. The transformer 104 has a first and second primary winding W1, W2 and a secondary winding W3. The first primary winding W1 is terminated between pins 1 and 2 of the transformer 104; the second primary winding W2 is terminated between pins 3 and 4 of the transformer 104; the secondary winding W3 is terminated between pins 5 and 6 of the transformer 104. The dots proximate pins 1, 4 and 6 indicate the polarity of voltages on the windings W1, W2, W3 of the transformer 104. For example, when the voltage on pin 1 on the secondary winding W3 is positive with respect to pin 2, the voltage on pin 6 on the secondary winding W3 is also positive with respect to pin 5.

As previously mentioned, the operation of the flyback converter 100 is well known in the art. When a transistor Q1 is turned ON, current flows through the first primary winding W1 and energy is stored in the magnetizing inductance of the transformer 104. When the transistor Q1 is ON, current does not flow in the secondary winding W3 because a diode D3 is reverse-biased (pin 6 is positive with respect to pin 5). When the transistor Q1 is turned OFF, current in the first primary winding W1 is cut off and the voltage polarity on the first primary winding W1 reverses. At the same time, the voltage polarity on the secondary winding W3 reverses, so that the diode D3 is forward-biased and current flows from the secondary winding W3 to a capacitor 126 through the diode D3. Thus, the energy (i.e., charge) stored in the capacitor 126 is replenished thereby maintaining a desired level of the output voltage VDC1.

Thus, the energy stored in the magnetizing inductance of the transformer 104 during the ON period of the transistor Q1 is transferred to the secondary winding W3 during the OFF period of the transistor Q1. The transformer 104, therefore, provides electrical isolation between the source 102 and the load and also performs the tasks of energy storage and transfer during the ON switching cycle of the transistor Q1.

The level of output voltage VDC1 may be controlled by controlling the width of pulses through a signal PWM CONTROL applied to the gate of the transistor Q1. Pulse-width modulation ("PWM") is a well-known technique. The output voltage VDC1 is sensed by a feedback circuit (not shown) and the width of the pulses through the signal PWM CONTROL are widened or narrowed to regulate the level of the output voltage VDC1.

As previously mentioned, the conventional flyback converter suffers from numerous drawbacks, namely, inefficient energy transfer between the primary and secondary winding of the transformer and poor scalability.

Figure 2:
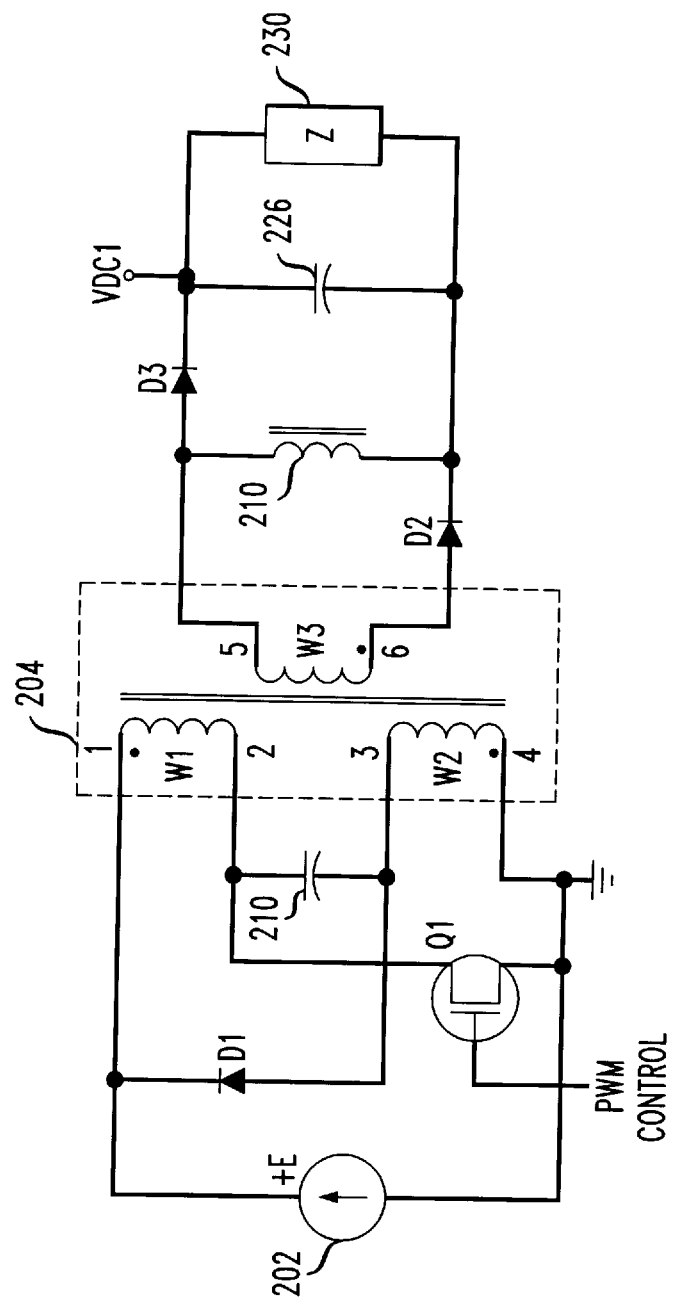
FIG. 2 illustrates a schematic diagram of an embodiment of an isolated flyback secondary inductor converter (IFSIC) constructed according to the principles of the present invention.

Turning now to FIG. 2, illustrated is a schematic diagram of an embodiment of an isolated flyback secondary inductor converter (IFSIC) 200 constructed according to the principles of the present invention. A IFSIC 200 is analogous to the flyback converter 100 of FIG. 1 with the addition of a diode D2 and an inductor 210 on the secondary side of the transformer 204. The inductor 210 and the diode D2 provide a current path that allows energy to be stored in the inductor 210, rather than in the magnetizing inductance of the transformer 204 when the transistor Q1 is ON. Thus, the energy is delivered directly to the secondary winding W3 by the transformer 204. The transfer of energy from the primary windings W1, W2 to the secondary winding W3 when the transistor Q1 is OFF is eliminated.

Figure 3:
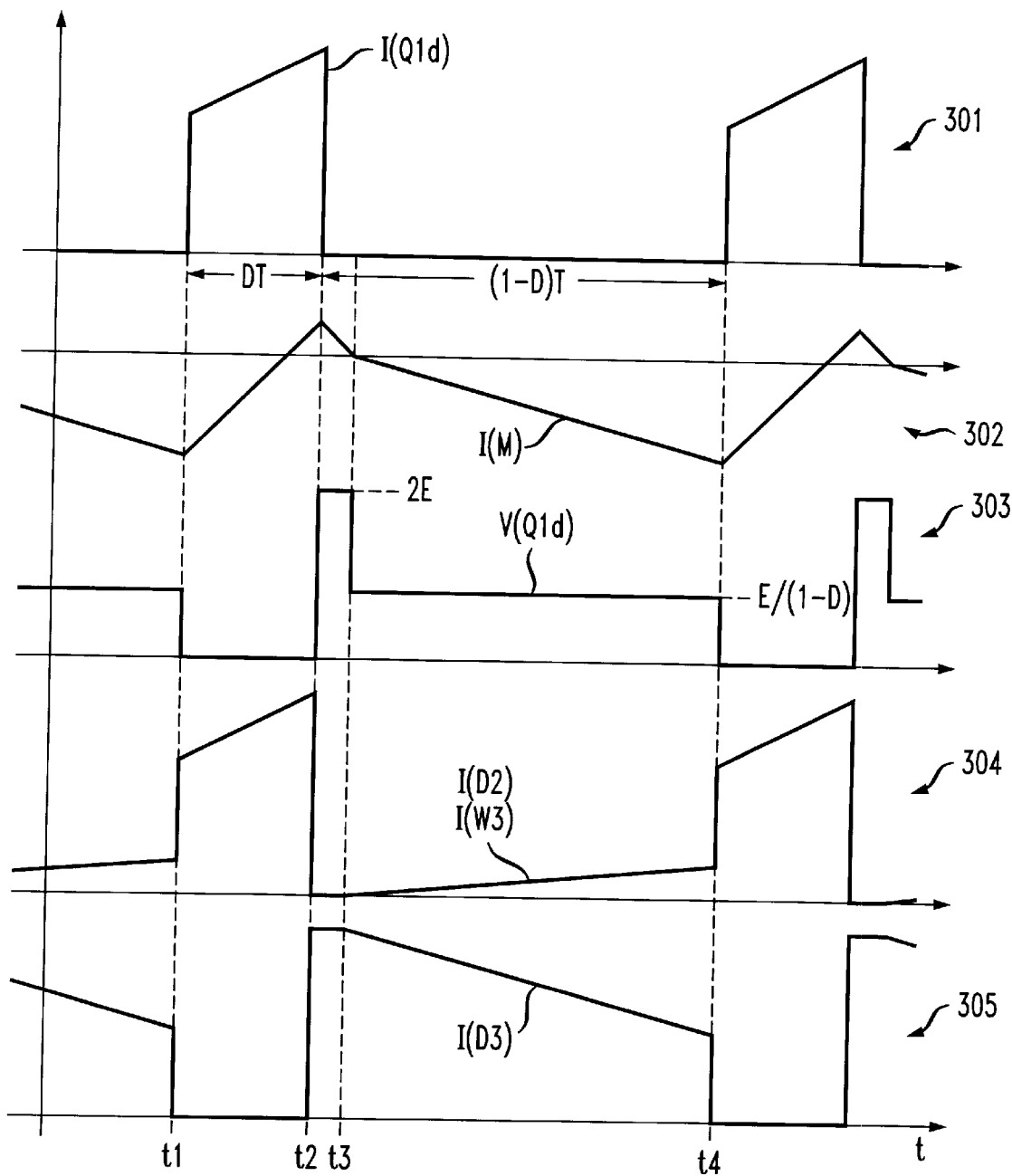
FIG. 3 illustrates a timing diagram that illustrates selected voltage and current characteristics of a switching cycle of the IFSIC of FIG. 2.

Turning now to FIG. 3, illustrated is a timing diagram that illustrates selected voltage and current characteristics of a switching cycle of the IFSIC 200 of FIG. 2. With continuing reference to FIG. 2, the basic operation of the IFSIC 200 will hereinafter be described. It should be noted that the relative sizes of the separations between time periods $t_1$, $t_2$, $t_3$, $t_4$, $t_5$ are drawn for clarity and ease of explanation, and are not necessarily to scale. For the purpose of illustration, it is assumed that the primary windings W1, W2 have an equal number of turns. During steady state operation, the average voltage across an input capacitor 210 is equal to the input voltage +E and the capacitor 226 maintains the output voltage VDC1.

A waveform 301 represents a drain current I(Q1d) through the drain of the transistor. The series of pulses on the gate of the transistor Q1 have a period T and a duty cycle D such that the transistor Q1 is ON for DT and OFF for (1−D)T. For the exemplary pulses shown in the waveform 301, the duty cycle is approximately 25% (i.e., D=0.25). During the DT portion of each switching cycle (i.e., between time periods $t_1$ and $t_2$), the transistor Q1 is ON and current increases through the first primary winding W1 (due to reflected secondary current), as indicated by the rising slope of the waveform 301. During this period, energy is transferred to the secondary winding W3 such that the secondary winding W3 and the diode D2 are conducting and the corresponding secondary winding and diode currents I(W3), I(D2) are increasing. The secondary winding and diode currents I(W3), I(D2) are illustrated in a waveform 304. During this period, the diodes D1, D3 are reverse-biased and do not conduct. The capacitor 226 maintains the output voltage VDC1 while a relatively small portion of its charge is depleted.

When the transistor Q1 turns OFF at time period $t_2$, the polarities of the first primary winding W1 and the secondary winding W3 are reversed, the diode D2 is reverse-biased and the voltage across the inductor 210 is also reversed. It should be noted that the turns ratios of the first primary winding W1 and the secondary winding W3 are equal. At this point, the diodes D1, D3 are forward-biased and conduct. The diode D1 conducts for a short time (from time period $t_2$ to time period $t_3$) clamping a voltage spike associated with the leakage inductance of the transformer 204 to twice the level of the source 202. The diode D3 turns on and commutates the current of the inductor 210 to the capacitor 226 and the load 230. The current in the inductor 210 is diverted through the diode D3 and places the depleted charge back on the capacitor 226. The voltage across the drain of the transistor Q1 (illustrated in waveform 303) is clamped by the capacitor 226 and diode D1 at the twice the input voltage [+2 (E)]. The diode D1 conducts for a short time (from time period $t_2$ to time period $t_3$) until the magnetizing current I(M) (represented in a waveform 302) of the transformer 204 decays to zero.

When the diode D1 stops conducting at the time period $t_3$, the inductor 210 causes the diode D2 and the secondary winding W3 to begin conducting again, as indicated between time periods $t_3$ and $t_4$. During this period, the energy stored in the inductor 210 is delivered to the capacitor 226 thereby replenishing the charge thereof. This induces the currents through the diode D3 and inductor 210 to ramp down. The voltage across the secondary winding W3 is clamped at approximately the output voltage VDC1. This voltage drives the magnetizing current in the secondary side of the transformer 204 thereby effectively resetting the core in about the third quadrant of the B/H hysteresis loop. The static transfer characteristic may be derived from the volt/second equilibrium across inductor 210:

$$VDC1=(nED)/(1-D), \text{ where } n=W3/W1.$$

Figure 4:
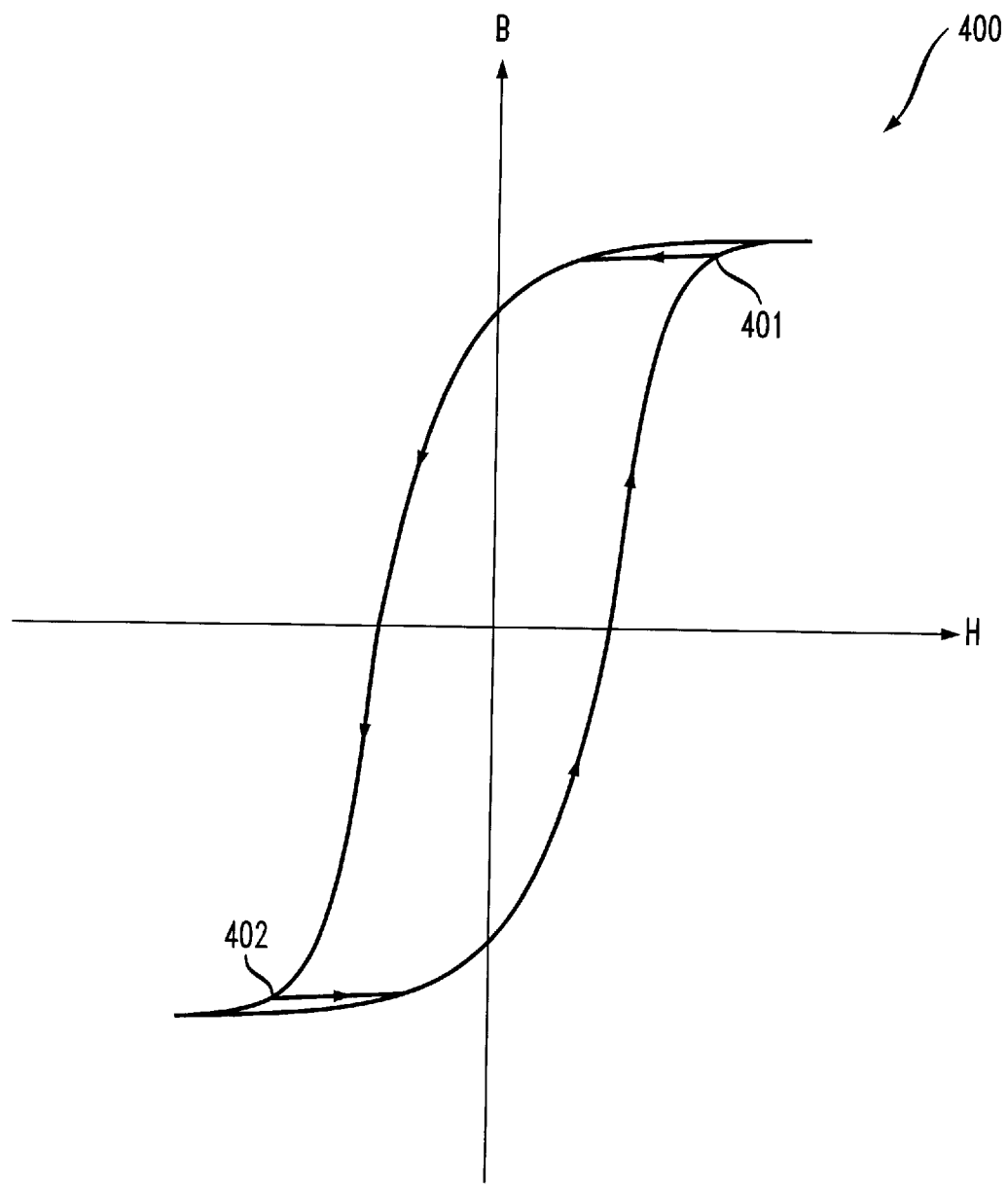
FIG. 4 illustrates an exemplary hysteresis curve depicting set and reset trajectories of a transformer core of the IFSIC of FIG. 2 during the switching cycle illustrated in FIG. 3.

Turning now to FIG. 4, illustrated is an exemplary hysteresis curve 400 depicting set and reset trajectories of a core of the transformer 204 of the IFSIC 200 of FIG. 2 during the switching cycle illustrated in FIG. 3. The trajectories are symmetrical with respect to the origin when DT=(1−D)T (i.e., 50% duty cycle). The action of the inductor 210 causes the core of the transformer 204 to be reset from the first quadrant (a point 401) to the third quadrant (a point 402) of the B/H hysteresis curve 400. In practical terms, this means that the core of the transformer 204 is utilized more efficiently and, consequently, a smaller number of turns is required on the primary windings W1, W2 and the secondary winding W3. As a result, the transformer 204 is smaller, lighter and easier to manufacture.

The core of the transformer 204 is magnetized when the transistor Q1 is ON. At the same time, the secondary winding W3 delivers energy to the inductor 210 via the diode D2. The current balance conditions for the windings W1, W2, W3 of the transformer 204 provides the equation:

$$I_{W3}=I_{W1}(W1/W2)-HL/W3=I_{W1}(W1/W3)-I_{M3}$$

where $I_{W3}$ is the current in the secondary winding W3, $I_{W1}$ is the current in the primary winding W1 and $I_{M3}$ is the magnetizing current in the secondary winding W3. The above equation indicates that the secondary current $I_{W3}$ (in the secondary winding W3) is less than the primary current $I_{W1}$ (in the primary winding W1) by the amount of the magnetizing current $I_{M3}$.

The core of the transformer 204 is reset when the transistor Q1 is OFF period; the output voltage VDC1 reverses the current in the secondary winding W3 through the action of the inductor 210 and the diode D3. During this time period, the balance of current in the windings W1, W2, W3 of the transformer 204 gives the equation:

$$I_{W3}=HL/W3=I_{M3}.$$

To maintain the recurrent process of magnetizing (setting) the core of the transformer 204 (via the primary winding W1) and demagnetizing (resetting) the core of the transformer 204 (via the secondary winding W3), the flow of current in the secondary winding W3 should be unidirectional. The diode D2 promotes that condition.

As noted above, the inductor 210 accumulates energy from the transformer 204 and transfers it to the output to maintain a regulated output voltage VDC1. Energy accumulates directly in the inductor 210 when the transistor Q1 is ON. Energy is delivered from the inductor 210 to the capacitor 226 when the transistor Q1 is OFF. Thus, the transformer 204 is not longer required to store energy and merely provides electrical isolation. The transformer 204 may, therefore, be designed to allow for greater flux excursions, which means that the transformer 204 may be smaller and more efficient. Also, the transformer 204 has almost symmetrical flux excursions further making the transformer 204 more efficient and eliminates the need for gapping. Furthermore, an energy storing inductor, such as the inductor 210, may also be used in two or more output stages of a multiple output stage power supply.

From the above, it is apparent that the present invention provides an IFSIC and method of operation thereof. The IFSIC has a transformer with a primary winding for receiving electrical energy from a source of electrical power and a secondary winding coupled to the primary winding. The IFSIC also has a switch for intermittently coupling the transformer to the source of electrical power. The IFSIC includes a series-coupled inductor and diode coupled in parallel with the secondary winding to provide a path for the energy from the transformer when the transistor is ON, allowing the energy to be stored in the inductor rather than in the transformer.

Although the present invention has been described in detail, those skilled in the art should understand that they can make various changes, substitutions and alterations herein without departing from the spirit and scope of the invention in its broadest form.

What is claimed is:

1. An isolated flyback secondary inductor converter (IFSIC) having a transformer with a primary winding for receiving electrical energy from a source of electrical power and a secondary winding coupled to said primary winding, said converter also having a switch for intermittently coupling said transformer to said source of electrical power, said converter, comprising:

a series-coupled inductor and diode coupled in parallel with said secondary winding to provide a path for said energy from said transformer when said transistor is ON, allowing said energy to be stored in said inductor rather than in said transformer.

2. The converter as recited in claim 1 wherein said switch is a metal oxide semiconductor field-effect transistor (MOSFET).

3. The converter as recited in claim 1 further comprising a second primary winding and a second diode, said switch intermittently coupling one of said primary windings to said source of electrical power and said second diode intermittently coupling another of said primary windings to said source of electrical power.

4. The IFSIC as recited in claim 1 further comprising a second primary winding, a capacitor and a second diode that cooperate to substantially protect said switch from overvoltage transients.

5. The converter as recited in claim 1 further comprising a capacitor for storing said energy and delivering said energy to an output of said converter.

6. The converter as recited in claim 1 further comprising a controller that modulates a switching of said switch.

7. The converter as recited in claim 1 wherein said transformer is free of a gap in a core thereof.

8. A method of operating an isolated flyback secondary inductor converter (IFSIC) having a transformer with a primary winding for receiving electrical energy from a source of electrical power and a secondary winding inductively coupled to said primary winding, said converter also having a switch for intermittently coupling said transformer to said source of electrical power, the method comprising the steps of:

provided a path for said energy from said switch when said switch is ON with a series-coupled inductor and diode coupled in parallel with said secondary winding; and storing said energy in said inductor rather than in said transformer.

9. The method as recited in claim 8 wherein said switch is a metal oxide semiconductor field-effect transistor (MOSFET).

10. The method as recited in claim 8 wherein said IFSIC further comprises a second primary winding and a second diode, the method further comprising the steps of:

intermittently coupling one of said primary windings to said source of electrical power with said switch; and intermittently coupling another of said primary windings to said source of electrical power with said second diode.

11. The method as recited in claim 8 further comprising the step of substantially protecting said switch from overvoltage transients.

12. The method as recited in claim 8 further comprising the steps of storing said energy in a capacitor and delivering said energy in said capacitor to an output of said converter.

13. The method as recited in claim 8 further comprising the step of modulating a switching of said switch with a controller.

14. The method as recited in claim 8 wherein said transformer is free of a gap in a core thereof.

15. An isolated flyback secondary inductor converter (IFSIC), comprising:

a transformer having first and second primary windings that receive electrical energy from a voltage source and a secondary winding inductively coupled to said primary windings that receives said energy from said primary windings;

a transistor that intermittently couples said first primary winding to said source;

an input diode that intermittently couples said second primary winding to said source;

a controller that modulates a switching of said transistor;

a first capacitor coupling said first and second primary windings;

a series-coupled inductor and diode coupled in parallel with said secondary winding to provide a path for said energy from said transformer when said transistor is ON, allowing said energy to be stored in said inductor rather than in said transformer; and a second capacitor that receives said energy from said inductor, stores said energy and delivers said energy to an output of said converter.

16. The IFSIC as recited in claim 15 wherein said transistor is a metal oxide semiconductor field-effect transistor (MOSFET).

17. The converter as recited in claim 15 wherein said transformer has a core.

18. The converter as recited in claim 17 wherein said core is free of a gap therein.

19. The converter as recited in claim 15 wherein said controller can adjust a duty cycle of said transistor.

20. The converter as recited in claim 15 wherein said transformer is substantially free of energy transfer from said primary windings to said secondary winding when said transistor is OFF.

* * * * *